(12) United States Patent
Berger et al.

(10) Patent No.: US 9,810,203 B2
(45) Date of Patent: Nov. 7, 2017

(54) METHOD AND CALCULATOR UNIT FOR DETERMINING TOTAL DAMAGE TO AT LEAST ONE ROTATING COMPONENT OF A DRIVE TRAIN

(71) Applicant: Robert Bosch GmbH, Stuttgart (DE)

(72) Inventors: Guenter Berger, Castrop-Rauxel (DE); Tobias Herrmann, Ismaning (DE); Boris Buchtala, Muehlacker (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 14/360,540

(22) PCT Filed: Oct. 25, 2012

(86) PCT No.: PCT/EP2012/004455
§ 371 (c)(1),
(2) Date: May 23, 2014

(87) PCT Pub. No.: WO2013/075777
PCT Pub. Date: May 30, 2013

(65) Prior Publication Data
US 2014/0318226 A1 Oct. 30, 2014

(30) Foreign Application Priority Data
Nov. 25, 2011 (DE) .......................... 10 2011 119 466

(51) Int. Cl.
*G01M 13/02* (2006.01)
*F03D 11/00* (2006.01)
(Continued)

(52) U.S. Cl.
CPC .......... *F03D 11/0091* (2013.01); *F03D 15/00* (2016.05); *F03D 17/00* (2016.05);
(Continued)

(58) Field of Classification Search
USPC ...................................................... 73/112.01
See application file for complete search history.

(56) References Cited

U.S. PATENT DOCUMENTS 7,617,741 B1 * 11/2009 Lowe-Wylde .......... F03D 7/042
73/862.29
2005/0276696 A1 * 12/2005 LeMieux .................. F03D 7/02
416/61
(Continued)

FOREIGN PATENT DOCUMENTS

CN 101196432 A 6/2008
DE 103 53 647 A1 10/2004
(Continued)

OTHER PUBLICATIONS

International Search Report corresponding to PCT Application No. PCT/EP2012/004455, dated Jan. 14, 2013 German and English language document) (7 pages).
(Continued)

*Primary Examiner* — Eric S McCall
(74) *Attorney, Agent, or Firm* — Maginot, Moore & Beck LLP

(57) ABSTRACT

A method for determining total damage to at least one rotating component of a drive train in a system, in particular a wind or wave energy system, includes determining over time during operation of the system a variable characterizing a rotational speed of the component and a variable characterizing a torque transmitted by the component. A load collective is determined in a calculator unit from the temporal progression of the variables, and the total damage is determined from a comparison of the determined load collective and a reference load collective.

15 Claims, 1 Drawing Sheet

(51) Int. Cl.
  *F16H 57/01* (2012.01)
  *G01M 15/14* (2006.01)
  *F03D 17/00* (2016.01)
  *F03D 15/00* (2016.01)
(52) U.S. Cl.
  CPC ............ *F16H 57/01* (2013.01); *G01M 15/14* (2013.01); *F05B 2240/60* (2013.01); *F05B 2260/40* (2013.01); *F05B 2260/80* (2013.01); *F16H 2057/012* (2013.01); *Y02E 10/722* (2013.01)

(56) References Cited

U.S. PATENT DOCUMENTS

| | | | | |
|---|---|---|---|---|
| 2006/0070435 | A1* | 4/2006 | LeMieux | F03D 15/00 73/168 |
| 2009/0263245 | A1* | 10/2009 | Shi | F03D 7/02 416/43 |
| 2010/0218609 | A1* | 9/2010 | Reed | G01N 29/11 73/598 |
| 2011/0036166 | A1* | 2/2011 | Lenz | G01M 1/16 73/455 |
| 2011/0041624 | A1* | 2/2011 | Barnes | G01M 13/02 73/862.042 |
| 2012/0024053 | A1* | 2/2012 | Cheng | F03D 11/0025 73/170.26 |
| 2012/0055247 | A1* | 3/2012 | Gonzalez Castro | F03D 11/0091 73/455 |
| 2012/0076651 | A1* | 3/2012 | Laurberg | F03D 7/02 416/1 |
| 2013/0025352 | A1* | 1/2013 | Teres Teres | F03D 7/0224 73/112.01 |
| 2015/0118047 | A1* | 4/2015 | Yoon | F03D 11/0091 416/1 |
| 2015/0240788 | A1* | 8/2015 | Kayama | F03D 11/0091 416/61 |

FOREIGN PATENT DOCUMENTS

| | | |
|---|---|---|
| DE | 10 2007 017 614 A1 | 10/2008 |
| EP | 1 132 614 A2 | 9/2001 |
| EP | 1 508 880 A2 | 2/2005 |
| EP | 1 930 855 A2 | 6/2008 |
| EP | 2 325 480 A1 | 5/2011 |
| EP | 2325480 A1 | 5/2011 |
| GB | 2 385 425 A | 8/2003 |
| WO | 2009/027255 A2 | 3/2009 |
| WO | 2009027255 A2 | 3/2009 |
| WO | 2011/012497 A2 | 2/2011 |
| WO | 2011012497 A3 | 6/2011 |

OTHER PUBLICATIONS

International Search Report corresponding to PCT Application No. PCT/EP2012/004455, dated Jan. 14, 2013 (English language document) (3 pages).
Beitz W. et al., "Taschenbuch für den Maschinenbau, PASSAGE", Dubbel, Springer-Verlag, Jan. 1, 1997, pp. E18-E21, XP002490806, Berlin, Germany (3 pages).
SIPO Office Action for CN201280057944.1, dated Apr. 14, 2016.

* cited by examiner

METHOD AND CALCULATOR UNIT FOR DETERMINING TOTAL DAMAGE TO AT LEAST ONE ROTATING COMPONENT OF A DRIVE TRAIN This application is a 35 U.S.C. §371 National Stage Application of PCT/EP2012/004455, filed on Oct. 25, 2012, which claims the benefit of priority to Serial No. DE 10 2011 119 466.9, filed on Nov. 25, 2011 in Germany, the disclosures of which are incorporated herein by reference in their entirety.

BACKGROUND

The present disclosure relates to a method for determining theoretical total damage to at least one rotating component of a drive train and to a calculator unit for carrying out said method.

Even though the present disclosure is described primarily with reference to wind turbine generator systems (WTGS), it is not restricted to these but can in principle be used for all types of power generating plants and systems in which a drive train is designed with a view to the likely load collective. However, the disclosure yields particular advantages for systems in which making a replacement is a particularly complex operation, for example in the case of offshore systems.

Components having drive trains, such as for example gear mechanisms, couplings and connecting elements (shafts), are important component parts of various electrical energy generating systems, such as for example wind turbine generator systems, hydroelectric generator systems, etc. The drive train performs the task of establishing a mechanical connection between a drive input (for example a rotor of a wind turbine generator system) and a drive output (for example a corresponding generator), by way of which energy is transmitted by a rotational movement. Drive train components, such as gear mechanisms, serve the purpose of converting the rotational speed and the torque that occur at the drive input into values that correspond to the operating range of the generator. Shafts establish the mechanical connection between the components involved. Further components, such as mechanical brakes or the like, may also be integrated in the drive train. Couplings may be arranged if need be between two components, for example to compensate for misalignment.

Drive trains or the components thereof have a certain lifetime, which depends substantially on the loading (torque, torsion, vibrations, etc.). Drive trains can therefore be designed with a view to a likely (pre-calculated) load collective.

An essential precondition for the cost-effectiveness of wind turbine generator systems is that they are operated as far as possible without any interruptions. Unplanned operational interruptions in particular generate considerable repair costs, and often lead to insurance claims.

To avoid such disadvantages, WIGS are often provided with what is known as condition-oriented maintenance, which is for example performed on the basis of a vibration-based condition monitoring (CM) of rotor blades in corresponding condition monitoring devices or systems (CMS). Such measures allow for example the early detection of incipient damage in rotor blades. CMS are often designed for remote diagnosis, the condition messages being evaluated at certified diagnosis centers, often by specially trained personnel.

However, components for which there are no known monitoring possibilities are also used in WIGS, the disclosure being aimed at the drive train and the components thereof. As mentioned, these may be designed on the basis of the likely load conditions. However, the actual lifetime is not known during operation, and so servicing is not performed in a condition-oriented manner. There is therefore the need for the possibility of determining the lifetime of components of a drive train in energy generating systems while they are operating ("online").

SUMMARY

The disclosure proposes a method for determining total damage to at least one rotating component of a drive train, in particular of a wind turbine generator system or wave energy generating system with the features of the disclosure and a correspondingly designed calculator unit for carrying it out. Advantageous refinements are the subject of the subclaims and the description that follows.

The disclosure provides the possibility of determining total damage to at least one rotating component of a drive train, in particular in wind turbine generator systems or wave energy generating systems, while they are operating and making it available to condition-oriented servicing. For this purpose, the disclosure makes use in particular of detection of the torque transmitted by the component to be monitored and the rotational speed, in order to carry out a classification in the direction of the load collective. The detection of the actual collective of the load in practice and comparison with the design collective allow the total damage that has occurred thus far (corresponding to a degree of wear) of the component to be determined.

Preferred methods for determining the actual collective make use in particular of methods that are known from the area of structural durability. Particularly suitable are counting methods, peak-value, instantaneous-value and dwell-time methods or a rainflow classification.

Preferably, only a variable characterizing the torque over time is determined. The variable characterizing the rotational speed can be determined from the progression of the torque signal. For example in the case of a wind turbine generator system, the tower shadow results in a periodic irregularity in the signal. Periodic elements may possibly also be identified in speed signals of other systems.

The disclosure is suitable in particular for use in wind turbine generator systems and wave energy generating systems (flow and tidal power generating systems in the area of river and ocean energy utilization), since, as mentioned, servicing is particularly complex here. Since the loads acting on the system at a given instant are also extremely variable (as a result of greatly varying wind speed or flow), knowledge of the total damage is particularly advantageous.

A calculator unit according to the disclosure, for example as a component part of a monitoring device (CMS), is designed, in particular in terms of programming, for carrying out a method according to the disclosure.

Implementation of the disclosure in the form of software is also advantageous, since this makes particularly low costs possible, in particular if an implementing calculator unit is also used for other tasks, and is therefore present in any case. Suitable data carriers for providing the computer program are, in particular, floppy disks, hard disks, flash memories, EEPROMs, CD-ROMs, DVDs, and so on. Downloading a program via computer networks (Internet, intranet, etc.) is also possible.

Further advantages and refinements of the disclosure emerge from the description and the accompanying drawings.

It goes without saying that the features mentioned above and those still to be explained below can be used not only in the respectively specified combination but also in other combinations or on their own without reporting from the scope of the present disclosure.

BRIEF DESCRIPTION OF THE DRAWINGS

The disclosure is schematically represented in the drawings on the basis of exemplary embodiments and is described in detail below with reference to the drawing drawings.

DETAILED DESCRIPTION

Figure 1:
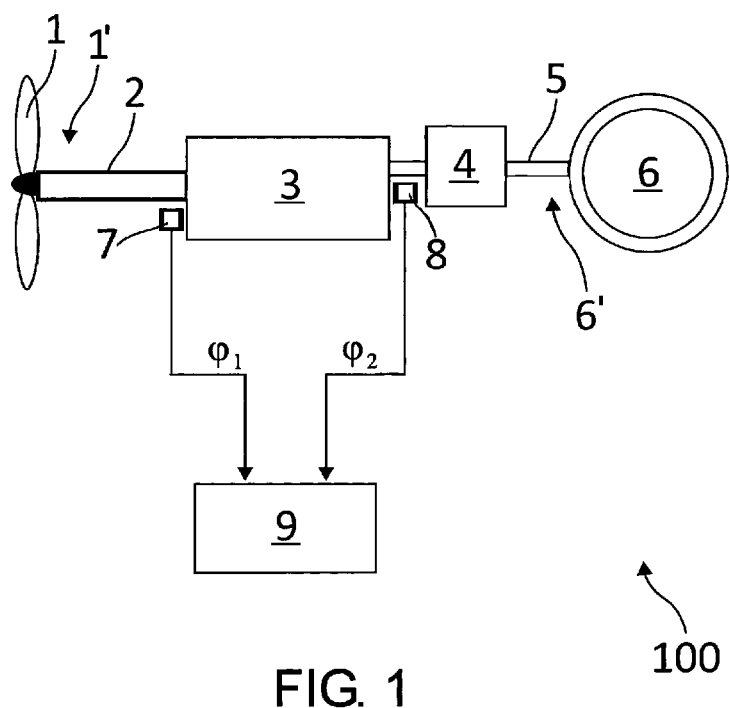
FIG. 1 shows an energy generating system according to a particularly preferred embodiment of the disclosure.

FIG. 1 shows in a schematic view the basic structure of an energy generating system 100, which is designed for carrying out the disclosure. The energy generating system 100 is formed as a wind turbine generator system with a rotor 1 and an electric generator 6, which are mechanically connected to one another by a drive train having a rotor drive-output shaft 2, a gear mechanism 3, a coupling 4 and a generator drive-input shaft 5. The rotor 1 is fitted as a drive input at an input end 1' of the drive train 2-5, the generator 6 is fitted as a drive output at an output end 6'. Two rotary angle sensors 7, 8 on the rotor side 1' and the generator side 6' of the gear mechanism 3 each determine an angle $\phi_1$ and $\phi_2$, respectively, as variables characterizing the torque. The difference in angle corresponds to a torsion angle over the gear mechanism 3, which is proportional to a torsional moment, and consequently a torque.

A preferred torque detection may also make use of one or more strain gages, which are fitted on a shaft and the signal of which is proportional to the twisting of the shaft (torsion). A torsion measurement may also be performed by means of a magnetic field passing through the shaft or from a distortion of the same.

The measured values are transmitted to a calculator unit 9, which is designed in terms of programming for carrying out a method according to the disclosure. Total damage of the gear mechanism is calculated in the calculator unit 9 on the basis of the sensor signals.

The calculator unit is designed to detect the measuring signals over time. In particular in the case of wind turbine generator systems, the tower shadow results in an irregularity of the signal, from which the current speed of the rotor or the shaft 2 can be determined. This advantageously allows the torque and at the same time the speed to be determined by detecting just a signal characterizing the torque. The difference between the rotary angles $\phi_1$ and $\phi_2$ gives the torsion angle over the gear mechanism 3, which is proportional to the torsional moment, and consequently the torque.

Figure 2:
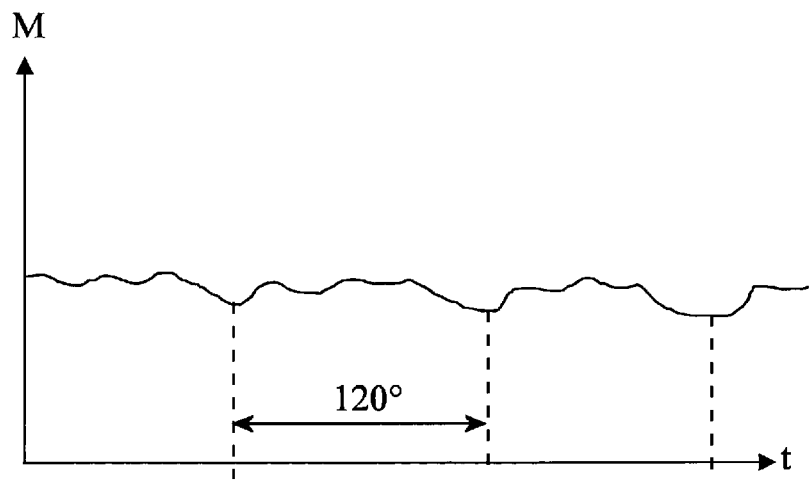
FIG. 2 shows a torque progression, given by way of example, in a component to be monitored, for example the gear mechanism from FIG. 1.

A temporal progression of the torque determined is plotted in FIG. 2. A regular torque fluctuation caused by the tower shadow can be determined from the progression. The time period corresponds to the angle between two rotor blades, in the case of conventional systems 120°. The speed can be determined from the time period.

The time period, the speed and the measured variable that is proportional to the torque are classified in the calculator unit to form a load collective and are continuously summated. This produces a load collective that is applicable over the lifetime of the drive train of the wind turbine generator system and can be compared with the load collective originally taken as a basis for the core components of the system.

Taking into consideration various Wöhler curve exponents (for example for rolling bearings, toothings, etc.), something known as a degree of total damage can be determined and compared with a permissible target damage. From this comparison, a remaining lifetime estimate can be made for the core components of a WTGS, and this can be used inter alia for preventive maintenance and possibly the replacement of certain components.

The invention claimed is:

1. A method for determining total damage to a gear mechanism of a drive train of a system, comprising:
   determining a first variable characterizing a torque transmitted by the gear mechanism over time during operation of the system;
   determining a second variable characterizing a rotational speed of a component of the gear mechanism over time during operation of the system;
   determining, with a calculator unit, a load collective based upon a first temporal progression of the first variable and a second temporal progression of the second variable; and
   determining a total damage to the gear mechanism by comparing the determined load collective with a reference load collective using the calculator unit.

2. The method as claimed in claim 1, wherein the reference load collective is an initial load collective based on an initial configuration of the gear mechanism.

3. The method as claimed in claim 2, wherein the initial load collective is based at least partially on an associated Wöhler curve exponent that characterizes an underlying source of at least part of the total damage.

4. The method as claimed in claim 1, wherein:
   the determination of the first variable includes detecting the first variable; and
   the determination of the second variable includes determining the second variable, with the calculator unit, based upon the detected first variable.

5. The method as claimed in claim 4, wherein the determination of the second variable is based at least partially upon a point of significance in the first temporal progression of the first variable.

6. The method as claimed in claim 1, wherein the determination of the first variable comprises:
   sensing an upstream rotary angle with a first rotary angle sensor located upstream of the gear mechanism;
   sensing a downstream rotary angle with a second rotary angle sensor located downstream of the gear mechanism; and
   determining the torque transmitted by the gear mechanism based upon a difference between the sensed upstream rotary angle and the sensed downstream rotary angle.

7. The method as claimed in claim 1, wherein the system is configured as a wind turbine generator system or a wave energy generating system.

8. A calculator unit configured to implement a method for determining total damage to a gear mechanism of a drive train of a system, the method including:
   determining a first variable characterizing a torque transmitted by the gear mechanism over time during operation of the system;

determining a second variable characterizing a rotational speed of a component of the gear mechanism over time during operation of the system;

determining a load collective based upon a first temporal progression of the first variable and a second temporal progression of the second variable; and determining a total damage to the gear mechanism by comparing the determined load collective and a reference load collective.

9. A system, comprising:

a drive train including a gear mechanism having at least one rotating component;

a drive input fitted at an input end of the drive train;

a drive output driven by the drive train and fitted at an output end of the drive train; and a calculator unit configured to implement a method for determining total damage to at least one rotating component of the gear mechanism of the drive train, the method including:

determining a first variable characterizing a torque transmitted by the gear mechanism over time during operation of the system;

determining a second variable characterizing a rotational speed of the component over time during operation of the system;

determining a load collective based upon a first temporal progression of the first variable and a second temporal progression of the second variable; and determining a total damage to the gear mechanism by comparing the determined load collective and a reference load collective.

10. The system as claimed in claim 9, further comprising at least one torque sensor configured to detect the torque transmitted by the gear mechanism.

11. The system as claimed in claim 9, wherein the system is configured as an energy generating system.

12. The system as claimed in claim 9, wherein the calculator unit is configured to determine the second variable based upon a detected value characterizing the first variable.

13. The system as claimed in claim 9, further comprising:

a first rotary angle sensor located upstream of the gear mechanism and configured to sense an upstream rotary angle;

a second rotary angle sensor located downstream of the gear mechanism and configured to sense a downstream rotary angle, wherein the calculator unit is further configured to determine the total damage to the gear mechanism by determining the torque transmitted by the gear mechanism based upon a difference between the sensed upstream rotary angle and the sensed downstream rotary angle.

14. The system as claimed in claim 13, the drive train further comprising:

a first shaft upstream of the gear mechanism, the first rotary angle sensor being configured to sense the upstream rotary angle of the first shaft; and a second shaft downstream of the gear mechanism, the second rotary angle sensor being configured to sense the downstream rotary angle of the second shaft.

15. The system as claimed in claim 14, further comprising:

a rotor operably connected to an end of the first shaft opposite the gearbox; and an electric generator operably connected to an end of the second shaft opposite the gearbox.

* * * * *